Patented Oct. 29, 1935

2,018,797

UNITED STATES PATENT OFFICE 2,018,797

METHOD FOR DRYING HYGROSCOPIC MATERIAL AND THE PRODUCT THEREOF

Lawrence W. Lewis, Beverly Hills, Calif.

No Drawing. Application January 22, 1935, Serial No. 2,965

10 Claims. (Cl. 99—5)

This invention relates to methods for drying carbohydrate-containing sirups and the like, and to the products resulting therefrom, and has particular application to the manufacture of non-hygroscopic powdered products derived from viscous water solutions such as sirups, molasses, molasses residues, gums, vegetable juices, and the like for use in feeds and fertilizers.

Much difficulty has heretofore been encountered in producing dried powdered or granular materials from viscous sirupy industrial products and by-products such as sirups, molasses, molasses residues (from alcoholic fermentation) gums, vegetable juices and the like due not only to the high viscosity and stickiness of the concentrated solutions, but also due to the hygroscopic character of the resulting solid product. To produce the solid products, the general method of spray or flash drying has, in general been employed, and the products from these methods have been costly, and not of suitable stability because of the hygroscopic nature of the powder, which causes it to become moist and sticky on exposure to air. In order to produce finely divided liquid spray for flash or spray drying, these solutions must be diluted with sufficient water so that the viscosity and stickiness is reduced to a point where the solution can be forced through a jet or nozzle, or thrown from a highspeed revolving disk into the required spray. This, of course, results in a larger amount of water per unit of solids and a consequent higher cost of drying. In addition to the high cost of preparing these sirupy materials in solid form, the solids or powders thus produced take up water from the air, and are unstable and difficult to handle. Another method of utilizing these sirupy materials, without drying, particularly in composite feeds, has been to spray the solution into other dry ingredients, but the method requires special mixing machinery, handling the sirup is difficult, and the amount which can be so used is limited by the capacity of the other dry ingredients to take up the liquid and still remain to all appearances substantially dry.

The process which I have discovered greatly reduces the viscosity and stickiness of the sirupy materials, and permits direct atomization of more concentrated liquids in the spray drying process. The products which I make by my process are non-sticky concentrated solutions containing the reaction products of an alkali with the ingredients of carbohydrate-containing sirups, such as sugar and malt sirups, molasses, molasses residues, gums, vegetable juices, and the like, which solutions are otherwise quite tacky or sticky, and substantially non-hygroscopic powdered or granular products made by drying such non-sticky solutions, either by spray drying, or other suitable drying processes.

For example, I may take ordinary black strap molasses containing 75 parts of solids and 25 parts of water. I dilute this with water until it contains 50 parts by weight of solids and 50 parts of water. To this sticky solution I add about two parts by weight of quicklime, either in dry form or preferably as a paste moistened with water. The mixture is then agitated by any suitable mechanical mixer until the quicklime is thoroughly distributed through the liquid, and then the reaction is allowed to go to completion in a tank used for storage of the treated liquid. After the reaction, which is evidenced by the production of heat, I find that the molasses solution is lower in viscosity and is much less sticky or tacky than before the treatment with the lime. The solution may then be dried by any suitable drying process, such as in trays, or on rolls or by spray drying methods, the latter being the preferred method because it takes advantage of the new and improved properties which I have produced in the liquid by my treating process. The molasses liquid, after the treatment with lime is in suitable condition to be forced through a spray nozzle, or to be forced onto a high speed revolving disk from which it is thrown in a finely divided liquid spray into a drying chamber. It is well known that black-strap molasses solutions containing as high as fifty percent solids, when not treated by my process to reduce stickiness and viscosity, may not be satisfactorily sprayed either through a spray nozzle, or by means of a high-speed atomizing disk. To atomize such liquids without my treatment requires further dilution with water, which greatly increases the cost of drying, because so much more water must be evaporated for each unit weight of powdered product produced. The powder which I obtain by spray drying my treated blackstrap molasses solution, as above described, is a fine brown powder, which does not appreciably take up moisture from the air, and which does not become moist and sticky in production or storage. The powdered black-strap molasses material produced from sirups without my treatment process, are hygroscopic and become moist and sticky even in the spray drier, and cannot be stored long without becoming lumpy and moist and sticky.

As another illustrative example of my process, I may use an evaporated solution of molasses residue, or distillery waste, containing approximately 50 parts of solid to 50 parts of water. These solids consist of invert sugars and other carbohydrates, gums and proteins. The solution is normally sticky and viscous, and cannot be readily dried by any previously known method without further dilution to the point where a finely divided spray may be produced with a nozzle or high-speed disk sprayer, and the product from such a process is always hygroscopic, and the operation is expensive. By my process, I treat this 50 percent solution with about one part of caustic soda, which for expediency is preferably dissolved in a small amount of water before adding to the main batch. After stirring thoroughly, the solution becomes less viscous and less sticky or tacky, and may be dried in a spray dryer as described above. The solid powder obtained from this treated molasses residue is a stable, non-hygroscopic material, which does not become moist and sticky in storage.

I have found that similar results may be attained by treating such sirupy liquids as water solutions of sugar sirups, malt syrups, molasses, molasses residues from distillery and brewing processes, gums, vegetable juices and the like with from about one to fifteen parts of caustic alkali to 100 parts of dry solids in the solutions, and that such treatment reduces the viscosity and stickiness or tackiness of the solutions so that they may be sprayed through nozzles or by rotating disks, for evaporation of the water, and that the dry powder so obtained, is not hygroscopic, but remains stable and dry after production. I have found that the minimum amount of alkali which may be used to produce these effects and these products varies from the different natures of the sirupy liquids; but I do not find that the amounts used above the minimums deleteriously effect the results, and up to certain maximum amounts, an excess increases the non-hygroscopic properties of the powder. The amount of alkali is therefore not critical, but depends upon the nature of the liquid being treated, and the effect of an excess of free alkali upon the uses to which the material is to be put. Quicklime is the preferred form of alkali, but other alkaline reagents give similar results, and may be used.

The treated solutions of sirupy materials, in which the viscosity and stickiness have been reduced by the treatment with free alkali as above described, may be used for various purposes, where the chemical properties of the material adapt them to be used, such as for mixing with other dried feeds and fertilizers, thus avoiding the special handling and mixing equipment required for this mixing, when the viscous and sticky original sirups are used. The treated solutions may also be dried by any suitable method, preferably spray drying, to produce the non-hygroscopic powders, which may be used for feeds and fertilizers. My process is more economical, because it permits the spray drying of more concentrated solutions than could otherwise be sprayed, and is more satisfactory because it yields products which are non-hygroscopic.

Because of the lack of a general group designation, the term "carbohydrate-containing sirups" is used herein to indicate that group of industrial and by-products sirupy liquids which in concentrated water solution are quite viscous and sticky, such as for example, sugar sirups, malt sirups, molasses, liquid molasses residues, distillery and brewery liquid residues, water soluble gums, vegetable juices, and the like, and mixtures of these materials. These materials are known to contain other ingredients than carbohydrates, and the term is not to be restricted to those solutions containing only carbohydrates.

I claim:
1. The process of making non-hygroscopic powder from viscous, sticky, water solutions of carbohydrate-containing sirups, comprising mixing the viscous sticky solution with an alkali in quantity sufficient to materially decrease the stickiness, spraying the finely divided liquid into a heated drying chamber, and collecting the dried product as a powder.

2. The process of making non-hygroscopic powder from viscous, sticky water solutions of carbohydrate-containing sirups, comprising mixing the viscous sticky solution with an alkali in quantity in excess of that required to neutralize the acidic materials present and in quantity sufficient to cause substantial lowering of the stickiness, spraying the finely divided liquid into a heated drying chamber, and collecting the dried product as a powder.

3. The process of making non-hygroscopic powder from viscous, sticky, water solutions of carbohydrate-containing sirups, comprising mixing the viscous sticky solution with lime in quantity in excess of that required to neutralize the acidic materials present and in quantity sufficient to cause substantial lowering of the stickiness, spraying the finely divided liquid into a heated drying chamber, and collecting the dried product as a powder.

4. The process of making non-hygroscopic powder from viscous, sticky water solutions of carbohydrate-containing sirups, comprising mixing the viscous sticky solution with from 1 to 15 parts of lime to each 100 parts of solids in the solution, spraying the finely divided liquid into a heated drying chamber, and collecting the dried product as a powder.

5. The process of making a powder from viscous sticky water solutions of carbohydrate-containing sirups, consisting in mixing such a solution with an alkali to produce a substantial decrease in the stickiness of the solution, and then reducing the solution to powdered form.

6. The process of making a powder from viscous sticky water solutions of carbohydrate-containing sirups, consisting in mixing such a solution with caustic lime to produce a substantial decrease in the stickiness of the solution, and then reducing the solution to powdered form.

7. The process of making a powder from viscous sticky water solutions of carbohydrate-containing sirups, consisting in mixing such a solution with caustic soda to produce a substantial decrease in the stickiness of the solution, and then reducing the solution to powdered form.

8. A product consisting of dried, powdered, non-hygroscopic carbohydrate-containing material which carbohydrate is normally hygroscopic in powdered condition having free carbohydrate and an alkali in part free and in part in chemical combination with the carbohydrate.

9. A product consisting of dried, powdered, non-hygroscopic carbohydrate-containing material which carbohydrate is normally hygroscopic in powdered condition having free carbohydrate and caustic lime in part free and in part in chemical combination with the carbohydrate.

10. A product consisting of dried, powdered, non-hygroscopic carbohydrate-containing material which carbohydrate is normally hygroscopic in powdered condition having free carbohydrate and caustic soda in part free and in part in chemical combination with the carbohydrate.

LAWRENCE W. LEWIS.